United States Patent
Asano et al.

(10) Patent No.: US 12,518,483 B2
(45) Date of Patent: Jan. 6, 2026

(54) NON-TRANSITORY COMPUTER-READABLE MEDIUM AND INFORMATION PROCESSING SYSTEM FOR RENDERING A 3D VIRTUAL SPACE WHERE 3D MODELS ARE ARRANGED

(71) Applicant: SQUARE ENIX CO., LTD., Tokyo (JP)

(72) Inventors: Tomoya Asano, Tokyo (JP); Yasuaki Arai, Tokyo (JP); Ippei Tokuchi, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 158 days.

(21) Appl. No.: 18/622,304

(22) Filed: Mar. 29, 2024

(65) Prior Publication Data
US 2024/0331284 A1    Oct. 3, 2024

(30) Foreign Application Priority Data
Mar. 29, 2023    (JP) .................................. 2023-053669

(51) Int. Cl.
  *G06T 17/00* (2006.01)
  *H04N 13/279* (2018.01)
(52) U.S. Cl.
  CPC ........... *G06T 17/00* (2013.01); *H04N 13/279* (2018.05)
(58) Field of Classification Search
  CPC ...... G06T 17/00; G06T 15/205; H04N 13/279
  See application file for complete search history.

(56) References Cited

U.S. PATENT DOCUMENTS

| | | | |
|---|---|---|---|
| 2006/0258449 A1* | 11/2006 | Yasui | G06T 13/20 463/31 |
| 2018/0300531 A1* | 10/2018 | Chang | G06T 11/008 |
| 2019/0156459 A1* | 5/2019 | Chen | G06T 3/4053 |
| 2021/0283502 A1* | 9/2021 | Shen | G06T 19/20 |
| 2024/0087236 A1* | 3/2024 | Swanson | G06T 15/04 |

OTHER PUBLICATIONS

"Octopath Traveler", Non Patent Literature; Video game by SQUARE ENIX; URL: https://www.jp.square-enix.com/octopathtraveler/.

* cited by examiner

*Primary Examiner* — Maurice L. Mcdowell, Jr.
(74) *Attorney, Agent, or Firm* — Dorsey & Whitney LLP

(57) ABSTRACT

An information processing system generates a display image by rendering a 3D virtual space in which one or more 3D models are arranged at a viewpoint of a virtual camera, determines a target object from the 3D models, renders only the target object at the viewpoint of the virtual camera to convert the target object into 2D image data, generates a plurality of dot pictures by making an inside of each dot uniform color information based on a predetermined rule, the 2D image data including a plurality of neighboring pixels as one dot, and displays the dot pictures instead of the 3D models in the 3D virtual space by attaching the dot pictures to a billboard set as an image attachable area which always faces the virtual camera in the 3D virtual space with respect to a position where the target object is arranged in the 3D virtual space.

6 Claims, 9 Drawing Sheets

THREE-DIMENSIONAL MODEL

DOT PICTURE

DOT PICTURE (OUTLINED)

NON-TRANSITORY COMPUTER-READABLE MEDIUM AND INFORMATION PROCESSING SYSTEM FOR RENDERING A 3D VIRTUAL SPACE WHERE 3D MODELS ARE ARRANGED

CROSS-REFERENCE TO RELATED APPLICATION

The present application claims priority to and the benefit of Japanese Patent Application No. 2023-053669 filed on Mar. 29, 2023, the disclosure of which is expressly incorporated herein by reference in its entirety for any purpose.

BACKGROUND

In video games, how to design characters and field spaces is an important factor for representing the world view of the game.

For example, https://www.jp.square-enix.com/octopath-traveler/(non-patent literature NPL 1) discloses a video game in which a dot picture is intentionally employed to express a world view which feels nostalgic.

SUMMARY

Conventionally, when a character is represented by dot pictures such as NPL 1, a manufacturer manually creates dot pictures one by one for each character and for each posture. Such manual creation of dot pictures has a huge amount of work in proportion to an increase in the volume of the game or an increase in the number of characters, which is a burden on the manufacturer.

It is an object of at least one embodiment of the present invention to provide an information processing program and an information processing apparatus capable of automatically generating dot pictures.

According to a non-limiting aspect, an information processing program according to an embodiment of the present invention is an information processing program for causing a server to realize a process of generating a display image by rendering a three-dimensional virtual space in which at least one or more three-dimensional models are arranged at a viewpoint of a virtual camera, wherein the server includes: a target determining function for determining a target object from the three-dimensional models arranged in the three-dimensional virtual space; a two-dimensional imaging function for rendering only the target object at the viewpoint of the virtual camera and converting the target object into two-dimensional image data; a dot picture generating function for generating dot pictures by making an inside of each dot uniform color information based on a predetermined rule; and a dot picture displaying function for displaying the dot pictures generated from the target object instead of the three-dimensional models of the target object in the three-dimensional virtual space by setting a billboard as an image attachable area which always faces the virtual camera in the three-dimensional virtual space with respect to a position where the target object is arranged in the three-dimensional virtual space and by attaching the dot pictures to the billboard.

According to a non-limiting aspect, an information processing apparatus according to an embodiment of the present invention is an information processing apparatus for generating a display image by rendering a three-dimensional virtual space in which at least one or more three-dimensional models are arranged at a viewpoint of a virtual camera, wherein the information processing apparatus includes a target determining unit that determines a target object from the three-dimensional models arranged in the three-dimensional virtual space; a two-dimensional imaging unit that converts only the target object into two-dimensional image data by rendering the target object at the viewpoint of the virtual camera; a dot picture generating unit for generating dot pictures by making an inside of each dot uniform color information based on a predetermined rule, wherein the two-dimensional image data relating to the target object includes a plurality of neighboring pixels as one dot; and a dot picture displaying unit that displays the dot pictures generated from a target object instead of the three-dimensional models of the target object in the three-dimensional virtual space by setting a billboard as one image attachable area always facing the virtual camera in the three-dimensional virtual space with respect to a position where the target object is arranged in the three-dimensional virtual space and by attaching the dot pictures to the billboard.

According to a non-limiting aspect, an information processing program according to an embodiment of the present invention is an information processing program for causing a user terminal to realize a process of generating a display image by rendering a three-dimensional virtual space in which at least one or more three-dimensional models are arranged at a viewpoint of a virtual camera, wherein the program causes the user terminal to realize a target determining function for determining a target object from the three-dimensional models arranged in a three-dimensional virtual space; a two-dimensional imaging function for converting only the target object into two-dimensional image data by rendering the target object at the viewpoint of the virtual camera; a dot picture generating function for generating dot pictures by making an inside of each dot uniform color information based on a predetermined rule; and a dot picture displaying function for displaying the dot pictures generated from the target object instead of the three-dimensional models of the target object in the three-dimensional virtual space by setting a billboard as an image attachable area which always faces the virtual camera in the three-dimensional virtual space with respect to a position where the target object is arranged in the three-dimensional virtual space and by attaching the dot pictures to the billboard.

According to each embodiment of the disclosure, one or two or more problems are solved.

DETAILED DESCRIPTION

Embodiments of the present invention will now be described with reference to the accompanying drawings. Note that various constituent elements in the examples of the embodiments described below can be appropriately combined as long as there is no contradiction or the like. In addition, description of contents described as an example of one embodiment may be omitted in other embodiments. In addition, the contents of operations and processes that are not related to the characteristic portions of the embodiments may be omitted. Further, the order of the various processes constituting the various flows described below is not the same as long as the contents of the processes do not contradictory.

First Embodiment

Figure 1:
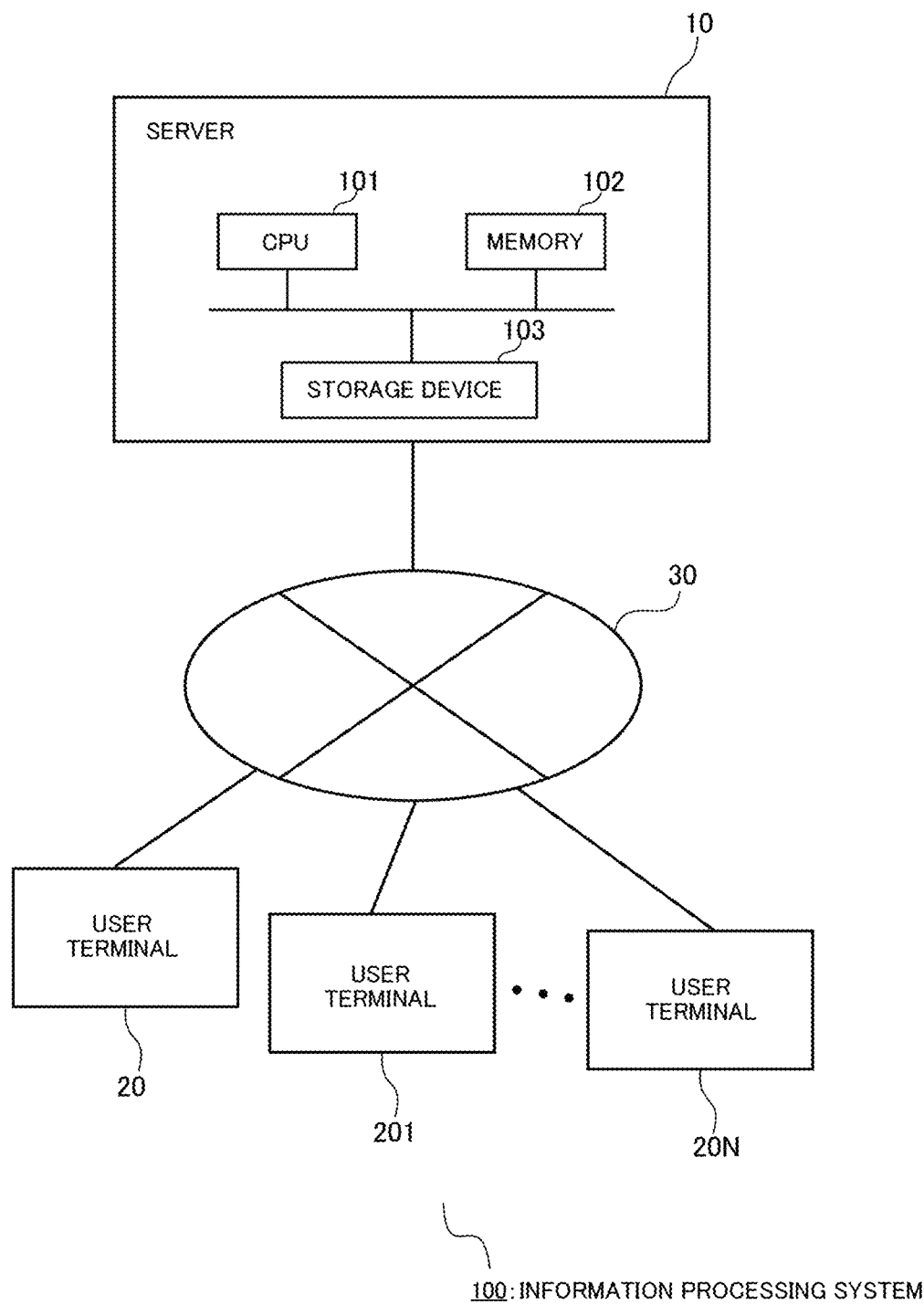
FIG. 1 is a block diagram showing an example of a configuration of an information processing system corresponding to at least one embodiment of the present invention.

FIG. 1 is a block diagram showing an example of a configuration of an information processing system 100 according to at least one embodiment of the present invention. As shown in FIG. 1, the information processing system 100 includes a server 10 and user terminals 20, 201 to 20N (N is an arbitrary integer) used by a user of the information processing system 100. The configuration of the information processing system 100 is not limited thereto, and a single user terminal may be used by a plurality of users, or a plurality of servers may be provided.

The server 10 and the plurality of user terminals 20, 201 to 20N are connected to a communication network 30 such as the Internet. Although not shown, the plurality of user terminals 20, 201 to 20N are connected to the communication network 30 by performing data communication with a base station managed by a communication provider via a wireless communication line.

The information processing system 100 includes a server 10 and a plurality of user terminals 20 and 201 to 20N, thereby realizing various functions for executing various processes.

The server 10 is managed by an administrator of the information processing system 100, and has various functions for providing information about various processes to a plurality of user terminals 20, 201 to 20N. In this example, the server 10 is configured by an information processing system such as a WWW server, and includes a storage medium for storing various kinds of information. The configuration of the server 10 is not particularly limited as long as it includes a general configuration for performing various types of processing as a computer such as a control unit and a communication unit. Hereinafter, an example of the hardware configuration of the server 10 will be briefly described.

As shown in FIG. 1, the server 10 includes at least CPU (Central Processing Unit) 101, a memory 102, and a storage device 103.

The CPU 101 is a central processing unit that performs various calculations and controls. Further, when the server 10 includes a GPU (Graphics Processing Unit), a part of various calculations and control may be performed by the GPU. The server 10 causes the CPU 101 to execute various kinds of information processing using the data read out to the memory 102 as appropriate, and stores the obtained processing result in the storage device 103 as necessary.

The storage device 103 functions as a storage medium for storing various kinds of information. The configuration of the storage device 103 is not particularly limited, but from the viewpoint of reducing the processing load on each of the plurality of user terminals 20 and 201 to 20N, it is preferable that the storage device 103 is configured to store all necessary various kinds of information. Such examples include HDDs and SSDs. However, the storage unit for storing various kinds of information only needs to be provided with a storage area in a state accessible by the server 10, and for example, a dedicated storage area may be provided outside the server 10.

Figure 2:
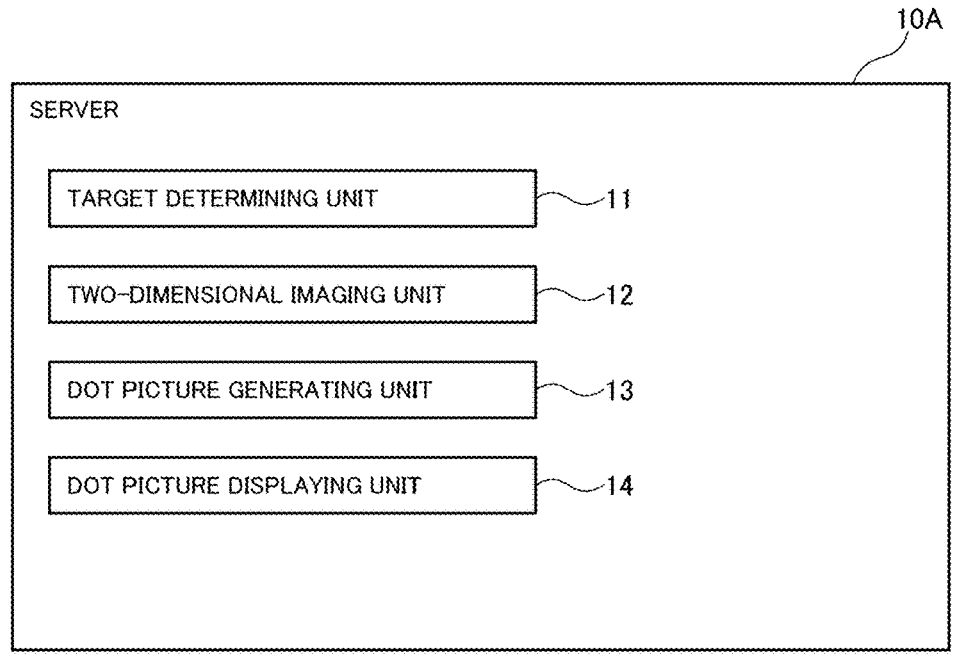
FIG. 2 is a block diagram showing a configuration of a server corresponding to at least one embodiment of the present invention.

FIG. 2 is a block diagram showing a configuration of a server 10A which is an example of the server 10 corresponding to at least one embodiment of the present invention. As shown in FIG. 2, the server 10A includes at least a target determining unit 11, a two-dimensional imaging unit 12, a dot picture generating unit 13, and a dot picture displaying unit 14.

The target determining unit 11 has a function of determining a target object from three-dimensional models arranged in a three-dimensional virtual space. The three-dimensional virtual space is a virtual space including three-dimensional coordinate information represented by three-dimensional computer graphics. The three-dimensional model is a model represented by three-dimensional computer graphics. The target determining unit 11 determines a target object to be formed into a dot picture. The target object may be a stationary object or a moving object. The number of object objects may be one or a plurality of object objects.

The two-dimensional imaging unit 12 has a function of rendering only the object at the viewpoint of the virtual camera and converting the object into two-dimensional image data. The virtual camera refers to a viewpoint position serving as a reference when rendering for displaying a three-dimensional virtual space on a display screen is performed. The two-dimensional imaging unit 12 converts only the target object into two-dimensional image data by rendering the target object without rendering the three-dimensional virtual space in which the target object is arranged.

The dot picture generating unit 13 has a function of generating a dot picture as uniform color information on the inside of each dot based on a predetermined rule. One feature of the dot picture is that the dot size is large enough to be visually recognized by the user. For this reason, a plurality of pixels of the two-dimensional image data having a high image quality are collectively converted into one dot of a predetermined size. For example, it is conceivable that nine pixels of three vertical pixels×three horizontal pixels are used as one dot. The inside of each dot is rewritten to uniform color information. Various methods of determining the color information may be used, but the average of the color information of the plurality of pixels constituting the dot may be obtained, or the color information of the center pixel among the plurality of pixels constituting the dot may be used. Dot pictures can be generated by performing dot conversion processing on all the pixels constituting the two-dimensional image data.

The dot picture displaying unit 14 has a function of setting a billboard as one image affixable area which always faces the virtual camera in the three-dimensional virtual space with respect to a position where the target object is arranged in the three-dimensional virtual space, and attaching a dot picture to the billboard, thereby displaying a dot picture generated from the target object instead of the three-dimensional model of the target object in the three-dimensional virtual space. The billboard refers to one image attachable area that always faces the virtual camera in the three-dimensional virtual space. Since the billboard always faces the virtual camera, even if it is arranged in the three-dimensional virtual space, a two-dimensional dot picture can be drawn without impairing information.

Each of the plurality of user terminals 20, 201 to 20N is managed by a user, and includes, for example, a personal computer, a mobile phone terminal, or PDA (Personal Digital Assistants). The configuration of the user terminal that can be included in the information processing system 100 is not limited to the example described above.

Further, each of the plurality of user terminals 20, 201 to 20N is connected to the communication network 30, and includes hardware (for example, a display device displaying a display screen including dot pictures) and software for executing various processes by communicating with the server 10. The plurality of user terminals 20, 201 to 20N may be configured to communicate directly with each other without passing through the server 10A.

Next, the operation of the information processing system 100 of this example will be described.

Figure 3:
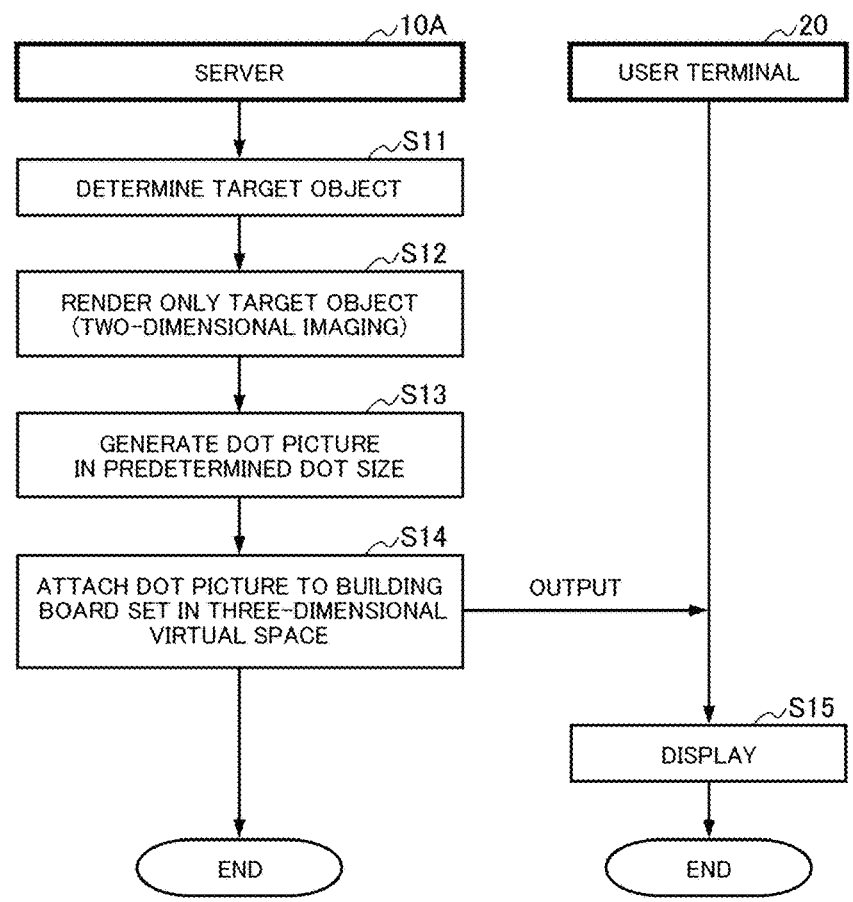
FIG. 3 is a flowchart showing an example of information processing corresponding to at least one embodiment of the present invention.

FIG. 3 is a flowchart showing an example of information processing corresponding to at least one embodiment of the present invention. Hereinafter, a case where the server 10A and the user terminal 20 execute information processing will be described as an example.

The information processing is started by determining a target object to be converted into a dot picture in the server 10A (step S11). Next, the server 10A generates two-dimensional image data of the target object by rendering only the target object (step S12). Next, the server 10A generates dot pictures by executing a process of collectively converting a plurality of pixels into one dot in a predetermined dot size (step S13). Then, the server 10A attaches dot pictures to the billboard set in the three-dimensional virtual space (step S14).

When the user terminal 20 receives the output information from the server 10A, the user terminal 20 displays a dot picture using a predetermined displaying unit (step S15).

Figure 4:
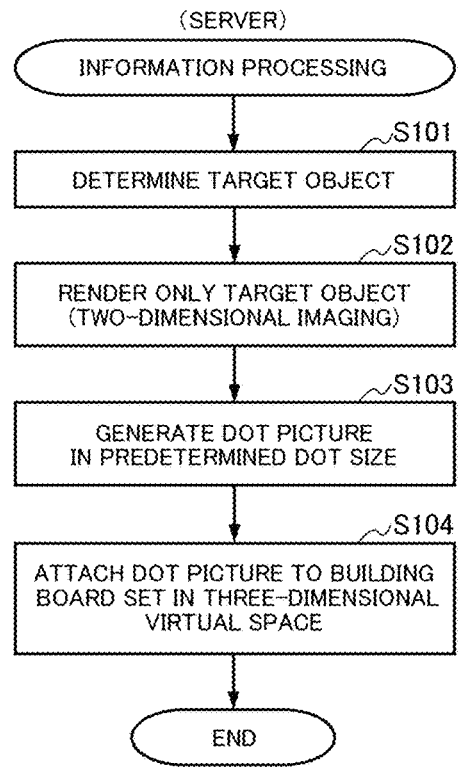
FIG. 4 is a flowchart showing an example of the operation on the server side in the information processing corresponding to at least one embodiment of the present invention.

FIG. 4 is a flowchart showing an example of the operation on the server side in the information processing according to at least one embodiment of the present invention. Here, the operation of the server 10A in the information processing system 100 will be de scribed again.

The information processing is started by determining a target object to be converted into a dot picture in the server 10A (step S101). Next, the server 10A generates two-dimensional image data of the target object by rendering only the target object (step S102). Next, the server 10A generates dot pictures by executing a process of collectively converting a plurality of pixels into one dot in a predetermined dot size (step S103). Then, the server 10A attaches a dot picture to the billboard set in the three-dimensional virtual space (step S104), and ends the information processing.

Figure 5:
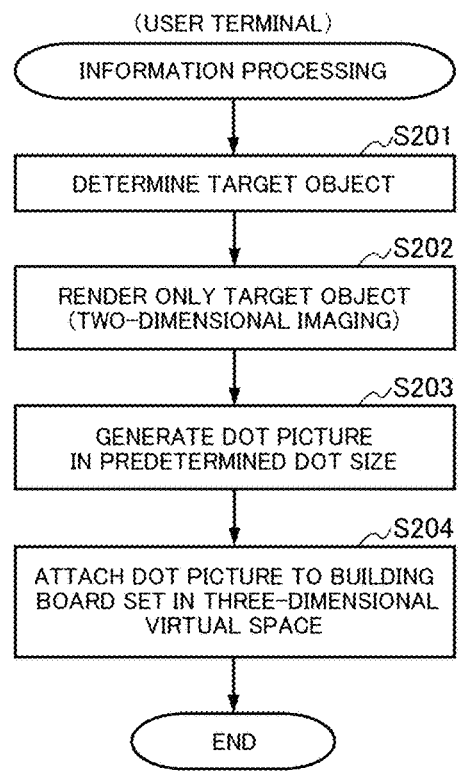
FIG. 5 is a flowchart showing an example of operation on the terminal side in information processing corresponding to at least one embodiment of the present invention.

FIG. 5 is a flowchart showing an example of operation on the terminal side in information processing corresponding to at least one embodiment of the present invention. Hereinafter, a case where the user terminal 20 executes information processing by itself will be described as an example. The terminal 20 has functions similar to those of the server 10A except that various kinds of information are received from the server 10A, and therefore description thereof is omitted from the viewpoint of avoiding redundant description.

The information processing is started by determining a target object to be converted into a dot picture in the user terminal 20 (step S201). Next, the user terminal 20 generates two-dimensional image data of the target object by rendering only the target object (step S202). Next, the user terminal 20 generates a dot picture by performing processing of collectively converting a plurality of pixels into one dot in a predetermined dot size (step S203). Then, the user terminal 20 attaches a dot picture to the billboard set in the three-dimensional virtual space (step S204), and ends the information processing.

As described above, as one aspect of the first embodiment, the server 10A includes the target determining unit 11, the two-dimensional imaging unit 12, the dot picture generating unit 13, and the dot picture displaying unit 14, determines a target object from the three-dimensional model arranged in the three-dimensional virtual space, renders only the target object at the viewpoint of the virtual camera to convert the target object into two-dimensional image data, and combines a plurality of pixels in the vicinity of the target object into one dot, and converts the two-dimensional image data relating to the target object into two-dimensional image data into one dot, since dot pictures generated from the target object are displayed instead of the three-dimensional model of the target object in the three-dimensional virtual space by generating dot pictures as uniform color information within each dot based on a predetermined rule, setting a billboard as one image affixable area always facing the virtual camera in the three-dimensional virtual space with respect to a position where the target object is arranged in the three-dimensional virtual space, and attaching the dot pictures to the billboard, the dot pictures generated from the target object are displayed in the three-dimensional virtual space, an arbitrary target object in the three-dimensional virtual space can be automatically displayed as a dot picture.

That is, once the three-dimensional virtual space is constructed by the three-dimensional model, arbitrary target objects in the three-dimensional virtual space can be automatically displayed as dot pictures, so that it is possible to omit the time and cost of dot picture creation as compared with the conventional method in which the manufacturer creates dot pictures by hand drawing one dot picture for each character and each posture.

Second Embodiment

Figure 6:
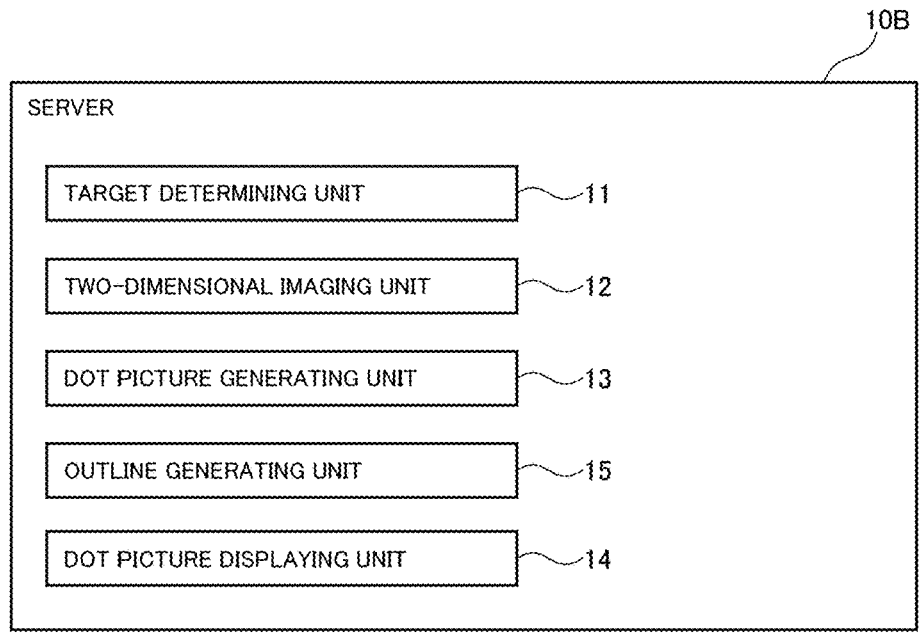
FIG. 6 is a block diagram showing a configuration of a server corresponding to at least one embodiment of the present invention.

FIG. 6 is a block diagram showing a configuration of a server 10B which is an example of the server 10 corresponding to at least one embodiment of the present invention. In this example, the server 10B includes at least a target determining unit 11, a two-dimensional imaging unit 12, a dot picture generating unit 13, an outline generating unit 15, and a dot picture displaying unit 14. With respect to the components denoted by the same reference numerals as those in the first embodiment, the description of the components functioning in the same manner as in the first embodiment will be omitted.

The outline generating unit 15 has a function of generating a dot picture for outline by generating a moving dot picture for each direction in which a dot picture generated from a target object is moved by a predetermined dot amount in a predetermined plurality of directions set in advance, calculating a difference between each moving dot picture for each direction and the original dot picture, and integrating the difference for all directions. Here, the outline refers to a line segment for easily indicating the outline or shape of a dot picture. If the target object is converted into two-dimensional image data and the two-dimensional image data is converted into a dot picture as it is, there is a possibility that the outline of the dot picture cannot be expressed and a dot picture in which a feature cannot be expressed is generated. Accordingly, the outline generating unit 15 generates an outline region by using the generated dot picture. Specifically, a moving dot picture for each direction is generated by moving the generated dot picture by a predetermined amount of dots (for example, one dot) in a plurality of predetermined directions, for example, four directions of up, down, left and right, which are set in advance. When moving in four directions, four moving dot pictures are generated for each direction. Next, the difference between the moving dot picture for each direction and the original dot picture is calculated, and the difference for all directions is integrated. In a contour portion or the like, a difference occurs because luminance information is different from a location of a moving destination. Then, for example, by moving in four directions of up, down, left, and right to obtain the difference and integrating the difference, it is possible to extract only the outline region. The outline region generated in this manner is combined with the original dot picture, and the outline region is set to a dark luminance value, whereby the outline can be generated in the dot picture. The direction-specific moving dot picture may be generated for four directions of up, down, left, and right, or may be generated for eight directions obtained by adding four diagonal directions to four directions of up, down, left, and right.

In the dot picture displaying unit 14, dot pictures in which outline regions are combined are attached to a billboard.

Figure 7:
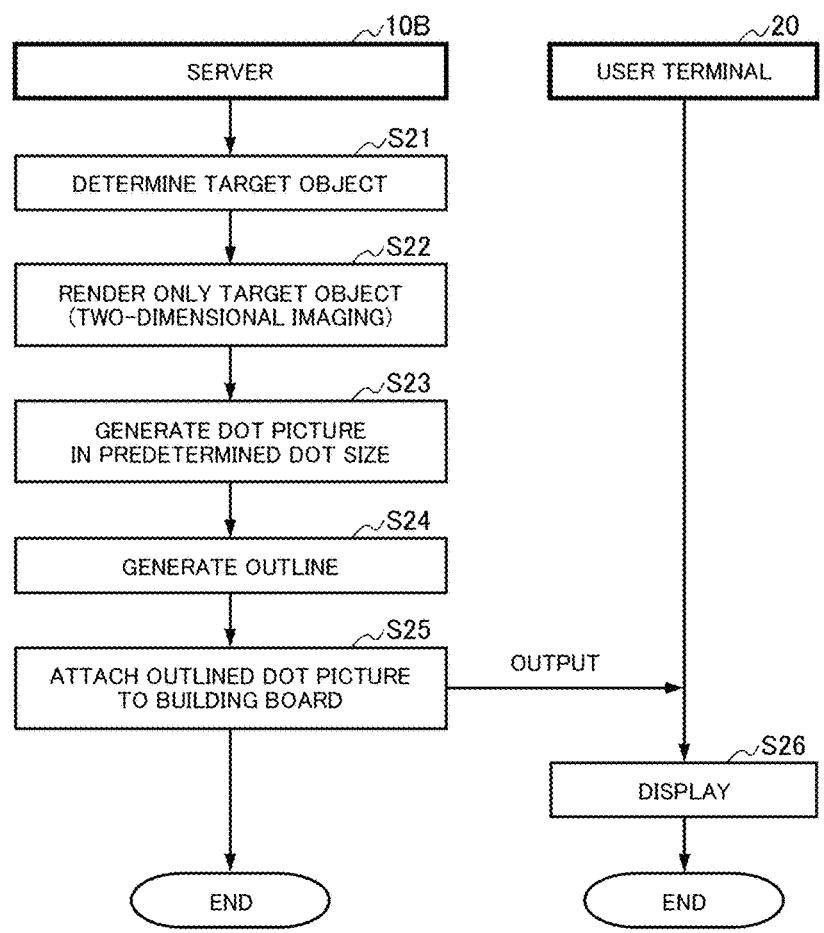
FIG. 7 is a flowchart showing an example of information processing corresponding to at least one embodiment of the present invention.

FIG. 7 is a flowchart showing an example of information processing corresponding to at least one embodiment of the present invention. Hereinafter, the operation of the server 10B and the user terminal 20 will be described as an example. Note that a description of a flowchart showing the operation of each of the server 10B and the user terminal 20 is omitted from the viewpoint of avoiding redundant description.

The information processing is started by determining a target object to be converted into a dot picture in the server 10B (step S21). Next, the server 10B generates two-dimensional image data of the target object by rendering only the target object (step S22). Next, the server 10B generates dot pictures by executing a process of collectively converting a plurality of pixels into one dot in a predetermined dot size (step S23). Next, the server 10B calculates a difference between the dot picture and the moving dot picture in each direction obtained by moving the dot picture in a plurality of directions, integrates the difference, generates an outline area, and generates an outlined dot picture (step S24). Then, the server 10B attaches a dot picture provided with an outline to the billboard set in the three-dimensional virtual space (step S25).

When receiving the output information from the server 10B, the user terminal 20 displays a dot picture provided with an outline using a predetermined displaying means (step S26).

As described above, as one aspect of the second embodiment, the server 10B includes the target determining unit 11, the two-dimensional imaging unit 12, the dot picture generating unit 13, the outline generating unit 15, and the dot picture displaying unit 14, the outline generating unit 15 of which generates moving dot pictures for each of a plurality of directions obtained by moving the dot pictures generated from the object in a predetermined plurality of directions set in advance by a predetermined amount of dots, and calculates a difference between the moving dot pictures for each direction and the dot pictures originally set in each direction, since the outline region is generated by integrating the differences in all directions, it is possible to generate a stable outline for a dot picture.

Third Embodiment

Figure 8:
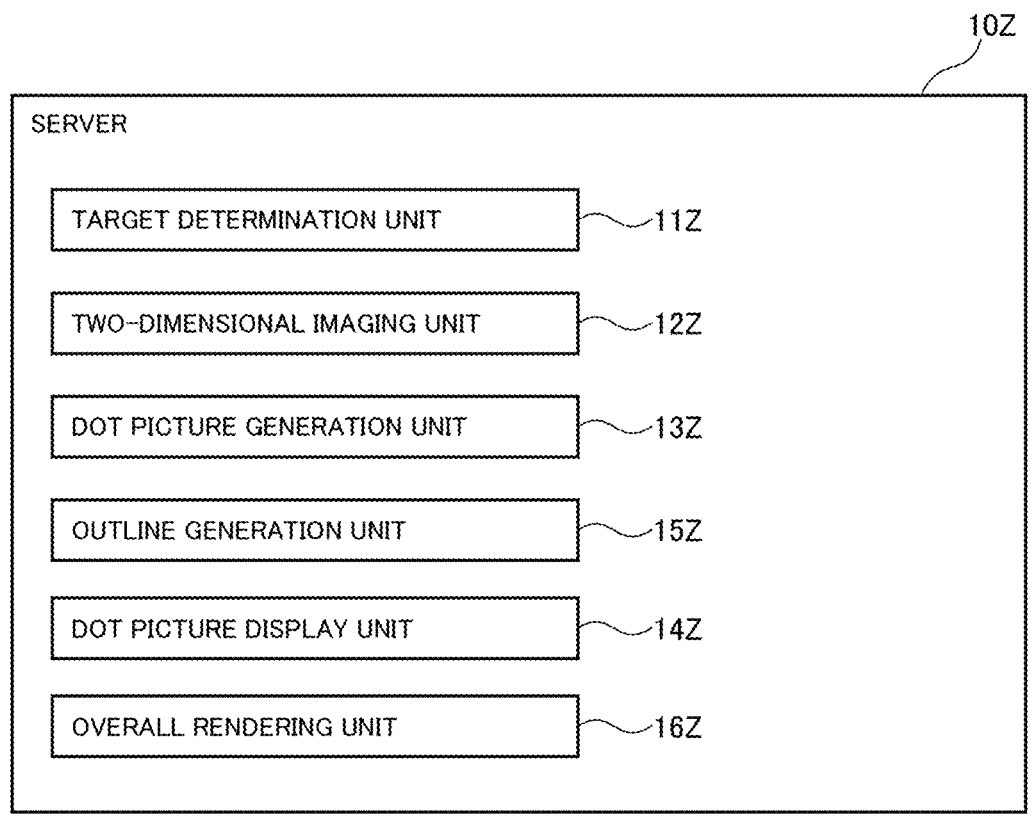
FIG. 8 is a block diagram showing a configuration of a server corresponding to at least one embodiment of the present invention.

FIG. 8 is a block diagram showing a configuration of a server 10Z which is an example of the server 10 corresponding to at least one embodiment of the present invention. In this example, the server 10Z includes at least a target determining unit 11Z, a two-dimensional imaging unit 12Z, a dot picture generating unit 13Z, an outline generating unit 15Z, a dot picture displaying unit 14Z, and an overall rendering unit 16Z.

The target determining unit 11Z has a function of determining a target object from three-dimensional models arranged in a three-dimensional virtual space. The three-dimensional virtual space is a virtual space including three-dimensional coordinate information represented by three-dimensional computer graphics. The three-dimensional model is a model represented by three-dimensional computer graphics. The target determining unit 11Z determines a target object to be formed into a dot picture. The target object may be a stationary object or a moving object. The number of object objects may be one or a plurality of object objects.

The two-dimensional imaging unit 12Z has a function of rendering only the object at the viewpoint of the virtual camera and converting the object into two-dimensional image data. The virtual camera refers to a viewpoint position serving as a reference when rendering for displaying a three-dimensional virtual space on a display screen is performed. The two-dimensional imaging unit 12Z converts only the target object into two-dimensional image data by rendering the target object without rendering the three-dimensional virtual space in which the target object is arranged.

The dot picture generating unit 13Z has a function of generating a dot picture by making an inside of each dot uniform color information based on a predetermined rule. One feature of the dot picture is that the dot size is large enough to be visually recognized by the user. For this reason, a plurality of pixels of the two-dimensional image data having a high image quality are collectively converted into one dot of a predetermined size. For example, it is conceivable that nine pixels of three vertical pixels×three horizontal pixels are used as one dot. The inside of each dot is rewritten to uniform color information. Various methods of determining the color information may be used, but the average of the color information of the plurality of pixels constituting the dot may be obtained, or the color information of the center pixel among the plurality of pixels constituting the dot may be used. Dot pictures can be generated by performing dot conversion processing on all the pixels constituting the two-dimensional image data.

The dot picture generating unit 13Z may generate the dot picture by changing the number of pixels for forming one dot for each object and/or for each environmental condition at the time of generating of the dot picture. That is, the dot size can be set to be large or small for each target object, or even for the same target object, the dot size can be changed for each scene in which a dot picture is generated, for example, in a video game. For example, in the case where a three-dimensional model of an original target object is created up to a fine point or the like, if a dot picture is formed with a large dot size, there is a possibility that fine portions are not reflected in the dot picture, and therefore, there is a possibility that the dot size of the target object including such fine portions is set to a small size.

The outline generating unit 15Z has a function of generating a dot picture for outline by generating a moving dot picture for each direction in which a dot picture generated from a target object is moved by a predetermined dot amount in a predetermined plurality of directions set in advance, calculating a difference between each moving dot picture for each direction and the original dot picture, and integrating the difference for all directions. Here, the outline refers to a line segment for easily indicating the outline or shape of a dot picture. If the target object is converted into two-dimensional image data and the two-dimensional image data is converted into a dot picture as it is, there is a possibility that the outline of the dot picture cannot be expressed and a dot picture in which a feature cannot be expressed is generated. Accordingly, the outline generating unit 15Z generates an outline region by using the generated dot picture. Specifically, a moving dot picture for each direction is generated by moving the generated dot picture by a predetermined amount of dots (for example, one dot) in a plurality of predetermined directions, for example, four directions of up, down, left and right, which are set in advance. When moving in four directions, four moving dot pictures are generated for each direction. Next, the difference between the moving dot picture for each direction and the original dot picture is calculated, and the difference for all directions is integrated. In a contour portion or the like, a difference occurs because luminance information is different from a location of a moving destination. Then, for example, by moving in four directions of up, down, left, and right to obtain the difference and integrating the difference, it is possible to extract only the outline region. The outline region generated in this manner is combined with the original dot picture, and the outline region is set to a dark luminance value, whereby the outline can be generated in the dot picture. The direction-specific moving dot picture may be generated for four directions of up, down, left, and right, or may be generated for eight directions obtained by adding four diagonal directions to four directions of up, down, left, and right.

The dot picture displaying section 14Z has a function of setting a billboard as one image affixable area which always faces the virtual camera in the three-dimensional virtual space with respect to a position where the target object is arranged in the three-dimensional virtual space, and attaching a dot picture to the billboard, thereby displaying a dot picture generated from the target object instead of the three-dimensional model of the target object in the three-dimensional virtual space. The billboard refers to one image attachable area that always faces the virtual camera in the three-dimensional virtual space. Since the billboard always faces the virtual camera, even if it is arranged in the three-dimensional virtual space, a two-dimensional dot picture can be drawn without impairing information. The dot picture attached to the billboard in the dot picture displaying section 14Z is a dot picture obtained by combining outlines in the outline generating section 15Z.

The overall rendering unit 16Z has a function of generating a display image by rendering a three-dimensional virtual space including a billboard to which dot pictures are attached at a viewpoint of a virtual camera so that the three-dimensional model of the target object is excluded from the rendering target and the influence of the three-dimensional model of the target object on the three-dimensional virtual space is reflected in the rendering. When a three-dimensional virtual space including a billboard to which dot pictures are attached is rendered, a target object which is formed into dot pictures and a three-dimensional virtual space which is not formed into dots are rendered. At the time of rendering, since the three-dimensional model of the object is excluded from the object to be rendered, the object to be rendered is not drawn as a three-dimensional model, but since the effect of the object to be rendered on the three-dimensional virtual space due to the three-dimensional model of the object to be rendered is reflected in the rendering, for example, shadows generated by blocking light from the light source by the object to be rendered can be rendered. By performing such processing, it is possible to realize realistic rendering in which the influence of the original object on the surrounding three-dimensional virtual space is reflected as it is, while displaying the object as a dot picture.

Next, the operation of the information processing system 100 of this example will be described.

Figure 9:
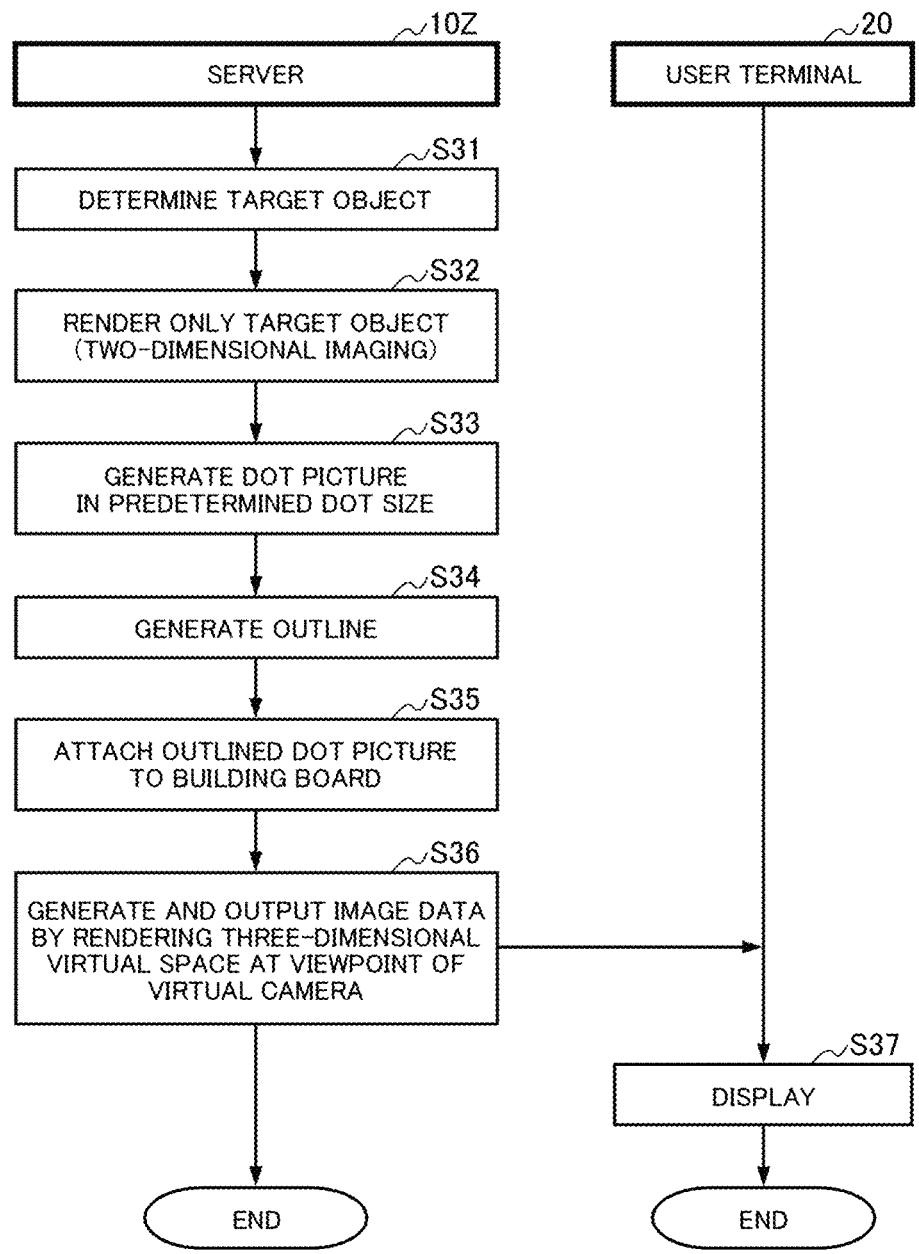
FIG. 9 is a flowchart showing an example of information processing corresponding to at least one embodiment of the present invention.

FIG. 9 is a flowchart showing an example of information processing corresponding to at least one embodiment of the present invention. Hereinafter, a case where the server 10Z and the user terminal 20 execute information processing will be described as an example.

The information processing is started by determining a target object to be converted into a dot picture in the server 10Z (step S31). Next, the server 10Z generates two-dimensional image data of the target object by rendering only the target object (step S32). Next, the server 10Z generates dot pictures by executing a process of collectively converting a plurality of pixels into one dot in a predetermined dot size (step S33). Next, the server 10Z calculates a difference between the dot picture and the moving dot picture in each direction obtained by moving the dot picture in a plurality of directions, integrates the difference, generates an outline area, and generates an outlined dot picture (step S34). Next, the server 10Z attaches a dot picture provided with an outline to the billboard set in the three-dimensional virtual space (step S35). Then, the server 10Z generates and outputs a display image by rendering the three-dimensional virtual space including the billboard to which the dot picture is attached at the viewpoint of the virtual camera (step S36).

When receiving the display screen from the server 10Z, the user terminal 20 displays the display screen using a predetermined displaying means (step S37).

Figure 10:
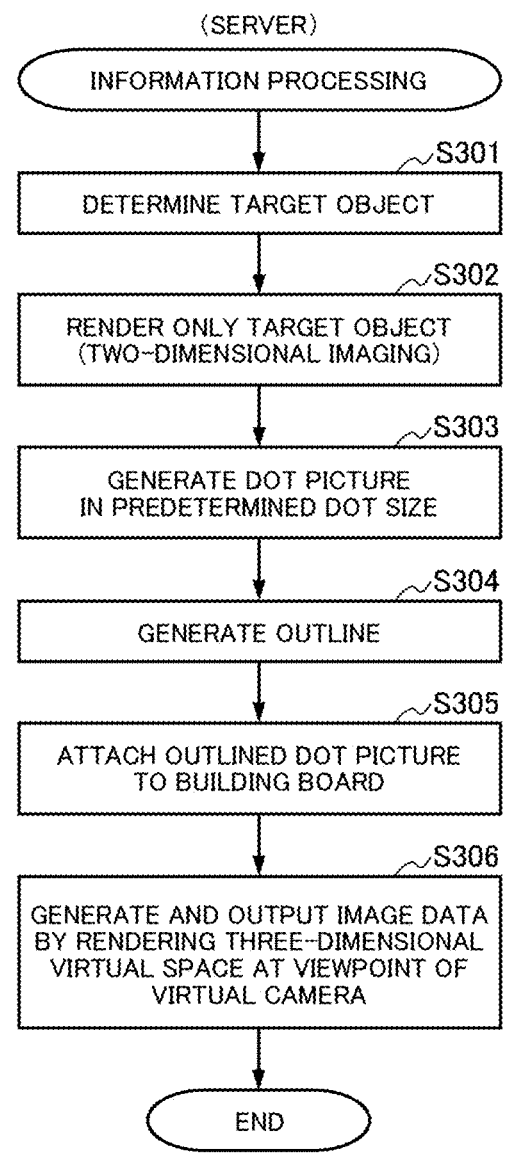
FIG. 10 is a flowchart showing an example of the operation on the server side in the information processing corresponding to at least one embodiment of the present invention.

FIG. 10 is a flowchart showing an example of the operation on the server side in the information processing according to at least one embodiment of the present invention. Here, the operation of the server 10Z in the information processing system 100 will be de scribed again.

The information processing is started by determining a target object to be converted into a dot picture in the server 10Z (step S301). Next, the server 10Z generates two-dimensional image data of the target object by rendering only the target object (step S302). Next, the server 10Z generates dot pictures by executing a process of collectively converting a plurality of pixels into one dot in a predetermined dot size (step S303). Next, the server 10Z calculates a difference between the dot picture and the moving dot picture in each direction obtained by moving the dot picture in a plurality of directions, integrates the difference, generates an outline area, and generates an outlined dot picture (step S304). Next, the server 10Z attaches a dot picture provided with an outline to the billboard set in the three-dimensional virtual space (step S305). Then, the server 10Z generates and outputs a display image by rendering the three-dimensional virtual space including the billboard to which the dot picture is attached at the viewpoint of the virtual camera (step S306), and ends the information processing.

Figure 11:
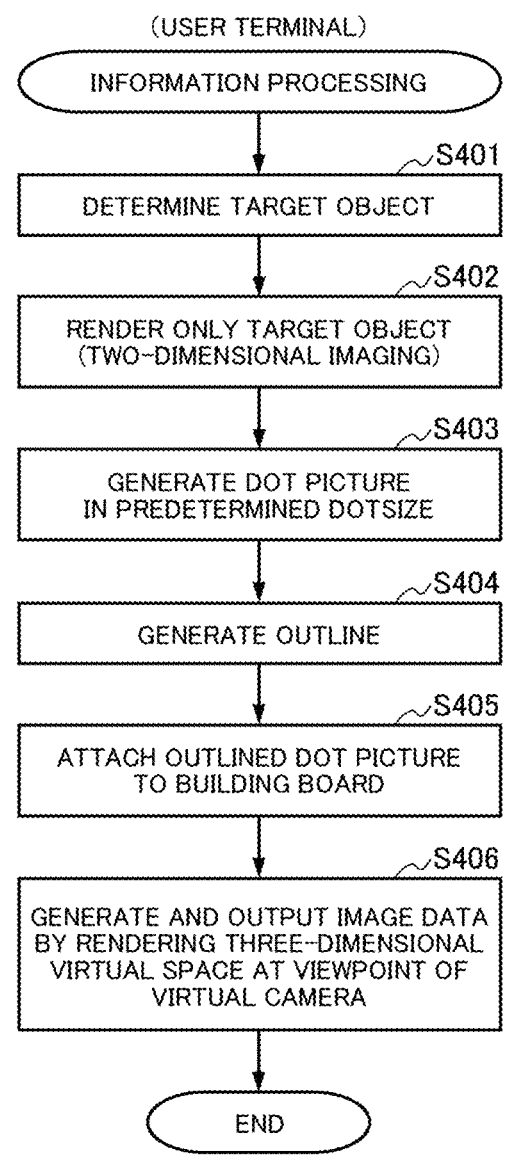
FIG. 11 is a flowchart showing an example of operation on the terminal side in information processing corresponding to at least one embodiment of the present invention.

FIG. 11 is a flowchart showing an example of operation on the terminal side in information processing corresponding to at least one embodiment of the present invention. Hereinafter, a case where the user terminal 20 executes information processing by itself will be described as an example. The configuration of the user terminal 20 has the same function as the configuration of the server 10Z except that the user terminal 20 receives various kinds of information from the server 10Z, and therefore description thereof is omitted from the viewpoint of avoiding redundant description.

The information processing is started by determining a target object to be converted into a dot picture in the user terminal 20 (step S401). Next, the user terminal 20 generates two-dimensional image data of the target object by rendering only the target object (step S402). Next, the user terminal 20 generates a dot picture by performing processing of collectively converting a plurality of pixels into one dot in a predetermined dot size (step S403). Next, the user terminal 20 calculates a difference between the dot picture and the moving dot picture in each direction obtained by moving the dot picture in a plurality of directions and integrates the difference to generate an outline area, and generates a dot picture provided with an outline (step S404). Next, the user terminal 20 attaches a dot picture provided with an outline to the billboard set in the three-dimensional virtual space (step S405). Then, the user terminal 20 renders the three-dimensional virtual space including the billboard to which the dot picture is attached at the viewpoint of the virtual camera, generates and outputs a display image (step S406), and ends the information processing.

As described above, as one aspect of the third embodiment, the server 10Z includes the target determining unit 11Z, the two-dimensional imaging unit 12Z, the dot picture generating unit 13Z, and the dot picture displaying unit 14Z, determines a target object from the three-dimensional model arranged in the three-dimensional virtual space, renders only the target object at the viewpoint of the virtual camera to convert the target object into two-dimensional image data, and combines a plurality of neighboring pixels into one dot, and converts the two-dimensional image data relating to the target object into two-dimensional image data, since dot pictures generated from the target object are displayed instead of the three-dimensional model of the target object in the three-dimensional virtual space by generating dot pictures as uniform color information within each dot based on a predetermined rule, setting a billboard as one image affixable area always facing the virtual camera in the three-dimensional virtual space with respect to a position where the target object is arranged in the three-dimensional virtual space, and attaching the dot pictures to the billboard, the dot pictures generated from the target object are displayed in the three-dimensional virtual space, an arbitrary target object in the three-dimensional virtual space can be automatically displayed as a dot picture.

Further, as one aspect of the third embodiment, since the server 10Z includes the outline generating unit 15Z, generates moving dot pictures for each of a plurality of directions in which dot pictures generated from a target object are respectively moved by a predetermined number of dots in a predetermined plurality of directions, calculates a difference between the moving dot pictures for each direction and the dot pictures based on the moving dot pictures for each direction, and integrates the difference for all directions, it is possible to generate a stable outline for the dot pictures.

Further, as one aspect of the third embodiment, since the server 10Z includes the overall rendering unit 16Z, and the three-dimensional model of the target object is excluded from the rendering target, and the influence of the three-dimensional model of the target object on the three-dimensional virtual space is reflected in the rendering so that the three-dimensional virtual space including the billboard to which the dot pictures are attached is rendered at the viewpoint of the virtual camera to generate the display image, while displaying the target object as a dot picture, realistic rendering can be realized in which the influence of the original target object on the surrounding three-dimensional virtual space is reflected as it is.

Note that in the outline generating unit 15Z, outlines are generated based on differences from moving dot pictures in directions respectively moved in a plurality of directions by a predetermined number of dots. In the back surface method, the normal line of each mesh constituting the three-dimensional model is inverted to generate a three-dimensional model whose front and back sides are reversed, and the original three-dimensional model is superimposed thereon to generate an outline. Two-dimensional image data including outlines can be generated by performing rendering and two-dimensional imaging in a state in which outlines are generated by the back surface method.

Figure 12:
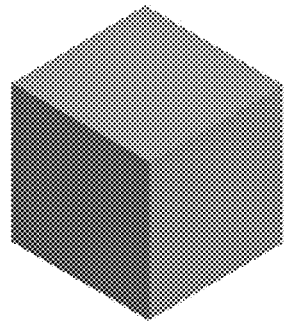
FIG. 12 is an explanatory diagram for explaining an example of generating dot pictures based on information processing corresponding to at least one embodiment of the present invention.
Figure 12:
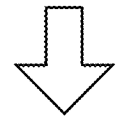
Figure 12:
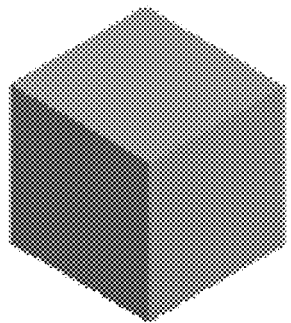
Figure 12:
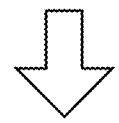
Figure 12:
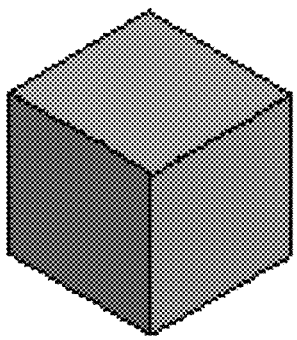

FIG. 12 is an explanatory diagram for explaining an example of generating dot pictures based on information processing corresponding to at least one embodiment of the present invention. In this example, as shown in FIG. 12, first, a three-dimensional model is selected as a target object to be converted into a dot picture. Next, a dot picture is generated by rendering only the three-dimensional model to form two-dimensional image data, and by converting the two-dimensional image data into one dot having uniform color information by combining a plurality of predetermined pixels. Then, an outline is generated from the dot picture, and the dot picture obtained by combining the outlines is attached to the billboard, whereby the process of forming the target object into a dot picture is completed.

It is also possible to always execute the information processing of dot imaging as described above in real time. That is, in a video game in which a game screen is generated by real-time rendering, dot pictures can be generated in real-time. If a three-dimensional model of a character or a three-dimensional model of a field or a background is generated in advance in a video game to generate a three-dimensional virtual space, dot pictures can be generated and handled in real time in a process of dot-picting a character appearing in the video game, such as a character operated in the three-dimensional virtual space or a character automatically controlled as an NPC. It is to be noted that it is possible not only to dot only the characters in the video game but also to dot all the objects arranged in the three-dimensional virtual space.

In addition, as long as the environment includes a three-dimensional virtual space in which three-dimensional objects are arranged, it is possible to form dots in the same manner as well as the video game. For example, it is possible to convert a three-dimensional model of an avatar corresponding to a user into a dot picture in real time in a metaverse space such as VR.

As described above, each embodiment of the present application solves one or more deficiencies. The effect according to each embodiment is an example of a non-limiting effect or effect.

In each of the above-described embodiments, the plurality of user terminals 20, 201 to 20N and the server 10 perform the above-described various processes in accordance with various control programs (for example, an information processing program) stored in a storage device included in the user terminal 20.

Further, the configuration of the information processing system 100 is not limited to the configuration described as an example of each of the embodiments described above, and for example, a configuration may be adopted in which a part or all of the processing described as the processing executed by the user terminal 20 is executed by the server 10, or a configuration may be adopted in which a part or all of the processing described as the processing executed by the server 10 is executed by any of the plurality of user terminals 20, 201 to 20N (for example, the user terminal 20). Further, a part or all of the storage unit included in the server 10 may be included in any one of the plurality of user terminals 20 and 201 to 20N. That is, some or all of the functions of either the user terminal 20 or the server 10 in the system 100 may be provided in the other one.

Further, the program may implement some or all of the functions described as examples of the above-described embodiments in a single apparatus that does not include a communication network.

Industrial Applicability

According to one embodiment of the present invention, it is useful for representing an object in a metaverse space by a dot picture.

APPENDIX

In the description of the above-described embodiments, at least the following inventions are described so that those skilled in the art can implement the inventions.

{1}

A non-transitory computer-readable medium comprising an information processing program that, when executed, causes a server to perform the following functions:
  A display image is generated by rendering a three-dimensional virtual space in which at least one or more three-dimensional models are arranged at a viewpoint of a virtual camera;
  A target object is determined from the three-dimensional models arranged in the three-dimensional virtual space;
  Rendering only the target object at the viewpoint of the virtual camera to convert the target object into two-dimensional image data;
  The two-dimensional image data relating to the target object includes a plurality of neighboring pixels as one dot, and dot pictures are generated by making an inside of each dot uniform color information based on a predetermined rule;
  Then, with respect to a position where the target object is arranged in the three-dimensional virtual space, a billboard is set as an image affixable area which always faces the virtual camera in the three-dimensional virtual space, and the dot pictures are attached to the billboard, whereby the dot pictures generated from the target object are displayed instead of the three-dimensional models of the target object in the three-dimensional virtual space.

{2}

In the non-transitory computer-readable medium described in {1}, the function further includes generating a movement dot picture for each of a plurality of directions obtained by moving the dot pictures generated from the target object by a predetermined amount of dots in a predetermined plurality of directions, calculating a difference between the movement dot picture for each direction and the dot pictures based on the movement dot picture for each of a plurality of directions, and integrating the difference for all directions to generate an outline area.

{3}

Alternatively, in the non-transitory computer-readable medium described in {1} or {2}, the function further includes generating the dot pictures by changing the number of pixels for configuring one dot for each target object and/or for each environmental condition at the time of generating the dot pictures.

{4}

The non-transitory computer-readable medium according to any one of {1} to {3}, wherein the function further includes rendering the three-dimensional virtual space including the billboard to which the dot pictures are attached at a viewpoint of a virtual camera to generate a display image in such a manner that the three-dimensional models of the target object are excluded from a rendering target, and an influence of the target object on the three-dimensional virtual space due to the three-dimensional models are reflected in rendering.

{5}

An information processing program for causing a user terminal capable of communicating with the server to realize at least one function among functions implemented by the server by the information processing program according to any one of {1} to {4}.

{6}

The information processing system comprises a communication network, a server, and a user terminal:
  One or more processors are configured as follows;
  A display image is generated by rendering a three-dimensional virtual space in which at least one or more three-dimensional models are arranged at a viewpoint of a virtual camera;
  A target object is determined from the three-dimensional models arranged in the three-dimensional virtual space;
  Rendering only the target object at the viewpoint of the virtual camera to convert the target object into two-dimensional image data;
  The two-dimensional image data relating to the target object includes a plurality of neighboring pixels as one dot, and dot pictures are generated by making an inside of each dot uniform color information based on a predetermined rule;

Then, with respect to a position where the target object is arranged in the three-dimensional virtual space, a billboard is set as an image affixable area which always faces the virtual camera in the three-dimensional virtual space, and the dot pictures are attached to the billboard, whereby the dot pictures generated from the target object are displayed instead of the three-dimensional models of the target object in the three-dimensional virtual space.

{7}
{6} The video game processing system according to {6},

The processor in the server is configured as follows.

A display image is generated by rendering a three-dimensional virtual space in which at least one of more three-dimensional models are arranged at a viewpoint of a virtual camera;

A target object is determined from the three-dimensional models arranged in a three-dimensional virtual space;

Rendering only the target object at the viewpoint of the virtual camera to convert the object into two-dimensional image data;

The two-dimensional image data relating to the target object includes a plurality of neighboring pixels as one dot, and dot pictures are generated by making an inside of each data uniform color information based on a predetermined rule;

Then, a billboard is set as one image attachable area which always faces the virtual camera in the three-dimensional virtual space with respect to a position where the target object is arranged in the three-dimensional virtual space, and the dot pictures are attached to the billboard, whereby the dot pictures generated from the target object are displayed instead of the three-dimensional model of the target object in the three-dimensional virtual space;

Then, the processor of the user terminal displays the outputted dot pictures.

{8}
An information processing apparatus for generating a display image by rendering a three-dimensional virtual space in which at least one three-dimensional model is arranged at a viewpoint of a virtual camera, A target determining unit that determines a target object from three-dimensional models arranged in a three-dimensional virtual space, A two-dimensional imaging unit that converts only the target object into two-dimensional image data by rendering the target object at a viewpoint of the virtual camera, A dot picture generating unit for generating dot pictures by making an inside of each dot uniform color information based on a predetermined rule, wherein the two-dimensional image data relating to the target object includes a plurality of neighboring pixels as one dot, A dot picture displaying unit that displays the dot pictures generated from a target object in place of a three-dimensional model of the target object on the three-dimensional virtual space by setting a billboard as one image attachable area always facing the virtual camera in the three-dimensional virtual space with respect to a position where the target object is disposed in the three-dimensional virtual space, and by attaching the dot pictures to the billboard.

An information processing apparatus including:
{9}
A non-transitory computer-readable medium comprising an information processing program that, when executed, causes a user terminal to perform the following functions:

A display image is generated by rendering a three-dimensional virtual space in which at least one or more three-dimensional models are arranged at a viewpoint of a virtual camera;

A target object is determined from the three-dimensional models arranged in the three-dimensional virtual space;

Rendering only the target object at the viewpoint of the virtual camera to convert the target object into two-dimensional image data;

The two-dimensional image data relating to the target object includes a plurality of neighboring pixels as one dot, and dot pictures are generated by making an inside of each dot uniform color information based on a predetermined rule;

Then, with respect to a position where the target object is arranged in the three-dimensional virtual space, a billboard is set as an image affixable area which always faces the virtual camera in the three-dimensional virtual space, and the dot pictures are attached to the billboard, whereby the dot pictures generated from the object are displayed instead of the three-dimensional models of the target object in the three-dimensional virtual space.

{10}
An information processing method for generating a display image by rendering a three-dimensional virtual space in which at least one or more three-dimensional models are arranged at a viewpoint of a virtual camera, A target determining process of determining a target object from the three-dimensional models arranged in the three-dimensional virtual space, A two-dimensional imaging process of rendering only the target object at the viewpoint of the virtual camera and converting the target object into two-dimensional image data, A dot picture generating process for generating dot pictures by making an inside of each dot uniform color information based on a predetermined rule; and, A dot picture displaying process for displaying the dot pictures generated from the target object in place of the three-dimensional model of the target object on the three-dimensional virtual space by setting a billboard as one image attachable area always facing the virtual camera in the three-dimensional virtual space with respect to a position where the target object is disposed in the three-dimensional virtual space, and by attaching the dot pictures to the billboard.

What is claimed is:

1. A non-transitory computer-readable medium storing an information processing program that, when executed, causes a server to perform:

generating a display image by rendering a three-dimensional virtual space in which at least one or more three-dimensional models are arranged at a viewpoint of a virtual camera;

determining a target object from the one or more three-dimensional models arranged in the three-dimensional virtual space;

rendering only the target object at the viewpoint of the virtual camera to convert the target object into two-dimensional image data;

generating a plurality of dot pictures by making an inside of each dot uniform color information based on a predetermined rule, wherein the two-dimensional image data relating to the target object includes a plurality of neighboring pixels as one dot; and displaying the plurality of dot pictures instead of the one or more three-dimensional models of the target object in the three-dimensional virtual space by setting a billboard as an image attachable area which always faces the virtual camera in the three-dimensional virtual space with respect to a position where the target object is arranged in the three-dimensional virtual space, and attaching the dot picture to the building board.

2. The non-transitory computer-readable medium according to claim 1, wherein the program, when executed, causes the server to further perform:

generating a moving dot picture for each of a predetermined plurality of directions by moving the plurality of dot pictures in the predetermined plurality of directions by a predetermined amount of dots;

calculating a difference between the moving dot picture for each of the plurality of directions and each of the plurality of dot pictures based on the moving dot picture for each of the plurality of directions; and integrating the difference for all of the plurality of directions to generate an outline area.

3. The non-transitory computer-readable medium according to claim 1, wherein the program, when executed, causes the server to further perform:

determining a plurality of target objects from the one or more three-dimensional models; and generating the plurality of dot pictures by changing a number of pixels for configuring one dot for each of the plurality of target objects and/or for each of environmental conditions at a time of generating the plurality of dot pictures.

4. The non-transitory computer-readable medium according to claim 1, wherein the program, when executed, causes the server to further perform rendering the three-dimensional virtual space including the billboard to which the plurality of dot pictures are attached at the viewpoint of the virtual camera to generate the display image in such a manner that the one or more three-dimensional models of the target object is excluded from a rendering target, and an influence of the one or more three-dimensional models of the target object on the three-dimensional virtual space is reflected in the rendering.

5. An information processing apparatus, comprising a processor configured to:

generate a display image by rendering a three-dimensional virtual space in which at least one or more three-dimensional models are arranged at a viewpoint of a virtual camera;

determine a target object from the one or more three-dimensional models arranged in the three-dimensional virtual space;

render only the target object at a viewpoint of a virtual camera to convert the target object into two-dimensional image data;

generate a plurality of dot pictures by making an inside of each dot uniform color information based on a predetermined rule, wherein the two-dimensional image data relating to the target object includes a plurality of neighboring pixels as one dot; and display the plurality of dot pictures instead of the plurality of three-dimensional models of the target object in the three-dimensional virtual space by setting a billboard as an image attachable area which always faces the virtual camera in the three-dimensional virtual space with respect to a position where the target object is arranged in the three-dimensional virtual space and by attaching the plurality of dot pictures to the billboard.

6. A non-transitory computer-readable medium storing an information processing program that, when executed, causes a user terminal to perform:

generating a display image by rendering a three-dimensional virtual space in which at least one or more three-dimensional models are arranged at a viewpoint of a virtual camera;

determining a target object from the one or more three-dimensional models arranged in the three-dimensional virtual space;

rendering only the target object at the viewpoint of the virtual camera to convert the target object into two-dimensional image data;

generating a plurality of dot pictures by making an inside of each dot uniform color information based on a predetermined rule, wherein the two-dimensional image data relating to the target object includes a plurality of neighboring pixels as one dot; and displaying the plurality of dot pictures instead of the three-dimensional models of the target object in the three-dimensional virtual space by setting a billboard as an image attachable area which always faces the virtual camera in the three-dimensional virtual space with respect to a position where the target object is arranged in the three-dimensional virtual space and by attaching the plurality of dot pictures to the billboard.

* * * * *